(12) United States Patent
Shoemake (10) Patent No.: US 7,039,038 B2
(45) Date of Patent: May 2, 2006

(54) ADAPTIVE FRAGMENTATION FOR WIRELESS NETWORK COMMUNICATIONS

(75) Inventor: Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 950 days.

(21) Appl. No.: 10/026,088

(22) Filed: Dec. 21, 2001

(65) Prior Publication Data

US 2002/0122413 A1    Sep. 5, 2002

Related U.S. Application Data

(60) Provisional application No. 60/262,507, filed on Jan. 18, 2001.

(51) Int. Cl.
    *H04J 3/16* (2006.01)
(52) U.S. Cl. ..................................... 370/349
(58) Field of Classification Search .............. 370/349, 370/470, 389, 465, 328, 351, 352, 350, 333, 370/332, 334, 324
    See application file for complete search history.

(56) References Cited

U.S. PATENT DOCUMENTS 5,987,326 A * 11/1999 Tiedemann et al. ......... 455/442
2004/0202242 A1* 10/2004 Lin et al. ..................... 375/227

OTHER PUBLICATIONS

Bakshi, Bikram S., et al., "Improving Performance of TCP over Wireless Networks," Distributed Computing Systems, Proceedings of the 17th International Conference in Baltimore, MD, USA, May 27-30, 1997, Los Alamitos, CA, USA, IEEE Comput. Soc. May 27, 1997, XP010229371, pp. 365-373.

(Continued)

*Primary Examiner*—Dang Ton
(74) *Attorney, Agent, or Firm*—Abdul Zindani; Frederick J. Telecky, Jr.; W. James Brady, III (57) ABSTRACT

A wireless local area network (LAN) adapter (20) that optimizes the length of message packets, for example according to the IEEE 802.11 standard, and in an environment having interfering transmissions (BL1 et seq.), is disclosed. The disclosed adapter (20) executes an adaptive process by way of which an adjustment to the packet length is derived based upon rate measures for the most recent two trial packet lengths. The rate measure corresponds to a packet success rate for that packet length, determined either from an estimating function or by actual measurements, multiplied by a ratio of the data portion of each packet to a total packet length including interpacket spacing. Upon convergence as the adjustment becomes smaller, the optimized packet length for best data rate given the present interference. A method of determining the need for packet length optimization is also disclosed, in which the actual packet error rate is compared against an expected packet error rate based upon signal-to-noise ratios.

16 Claims, 3 Drawing Sheets

OTHER PUBLICATIONS

Lettieri, Paul, et al., "Adaptive Frame Length Control for Improving Wireless Link Throughput, Range, and Energy Efficiency," Infocom '98, Seventeenth Annual Joint Conference of the IEEE Computer and Communications Societies, IEEE San Francisco, CA, USA, Mar. 29-Apr. 2, 1998, New York, NY, USA, IEEE, US, Mar. 29, 1998, XP010270390, pp. 564-571.

Guth, Kurtis J., et al., "Adaptive Stop-and-Wait ARQ Strategy for Mobile Data Communications," Computer Communications, Elsevier Science Publishers BV, Amsterdam, NL, vol. 14, No. 7, Sep. 1, 1991, XP000224927, pp. 405-412.

* cited by examiner

ADAPTIVE FRAGMENTATION FOR WIRELESS NETWORK COMMUNICATIONS

CROSS-REFERENCE TO RELATED APPLICATIONS

This application claims priority, under 35 U.S.C. §119(e), of provisional application No. 60/262,507, filed Jan. 18, 2001.

STATEMENT REGARDING FEDERALLY SPONSORED RESEARCH OR DEVELOPMENT

Not applicable.

BACKGROUND OF THE INVENTION

This invention is in the field of wireless communications, and is more specifically directed to the wireless transmitting of data packets in an environment containing possible interfering communications.

Wireless local area networks (LANs) have become increasingly popular in recent years. Typically, wireless LAN installations include an access point sited within the vicinity of the various client workstations. The access point, which is typically a network element coupled to a computer workstation by way of Ethernet cabling or the like, serves as a hub for wireless devices within its communications range. Bidirectional communications are carried out between the access point and wireless network-enabled devices that are in range (typically on the order of 100 m), enabling the wireless devices to communicate with one another, with other computers resident on the same wired network as the access point, and with remote computers over the Internet.

Under current wireless networking technology and standards, an example of such being the IEEE 802.11b standard, the wireless communications are packet-based, in that each transmission is transmitted in the form of multiple packets. By being packet-based, the packets need not be transmitted or received in sequence, and will generally not be contiguous in time. Indeed, as known in the art, packets that are corrupted in transmission are retransmitted later in time. Upon receipt of all of the packets for a communication, the receiver resequences and combines the packets into a coherent message. In the 802.11 context, each message packet typically includes a preamble and header portion that contains control information and also information identifying the packet (identifying the message, the sequence of the packet in the message, source and destination nodes, etc.), and also includes a payload portion that contains the actual data being communicated, along with a checksum by way of which errors in the payload portion can be detected and possibly corrected.

Modern wireless networks typically operate in the unlicensed Industrial, Scientific, and Medical (ISM) band which, as known in the art, includes frequencies from about 2400.0 MHz to about 2483.5 MHz. Conventional 802.11 transmission s are signals according to the QPSK and BPSK constellations that are modulated into a "channel" within the ISM band having about a −20 dB bandwidth of about 16 MHz, and providing data rates that can reach up to about 11 MHz. Other wireless devices also communicate in this band. An example of such devices are the newly-popular "Bluetooth" devices, which transmit in a frequency-hopping manner within the ISM band. More specifically, Bluetooth transmissions are carried out in channels that are about 1 MHz in width (−20 dB) that change frequency periodically (e.g., about every 625 μsec).

Considering the likelihood that both 802.11 and Bluetooth devices may be operating within the range of the 802.11 access point, and also considering other ISM transmissions such as wireless telephones, garage door openers, and the like, signal interference can often occur. If two different transmissions occur at the same time in the same frequency channels within the ISM band, typically both transmissions will be corrupted. Accordingly, those in the art have studied ways to reduce the incidence of collisions in this unlicensed band.

Fragmentation is a conventional approach to reducing the packet error rate due to interference. In general, fragmentation enforces an upper limit on packet length, thus reducing the likelihood that an interfering signal will occur within the packet. Typically, under the 802.11b standard, a parameter is used to set the number of payload data bytes transmitted in a packet for a given bit rate, which thus sets the packet length (or fragmentation level). As is fundamental in the art, because interference along any portion of the packet will corrupt the entire packet, longer packet lengths generally result in a higher probability of packet error due to interference, for a given level of interference. Increasing the fragmentation of the transmission, by using shorter payload portions in each packet, therefore provides a reduced packet error rate. However, because of the existence of a certain amount of overhead associated with the transmission of each packet the average throughput rate decreases as the packet lengths are decreased. Examples of such network overhead include packet preambles, packet headers and spacing between packets.

This tradeoff between packet error rate and overhead makes the selection of a fragmentation in a wireless network an important constraint on the overall network performance. Making this selection even more difficult is the nature of the interferers that are now commonly present within a wireless network signal range. Many potential interferers, such as wireless telephones, garage door openers, and the like, may interfere only within certain times of operation. Other interferers, such as frequency-hopping transmissions in a Bluetooth network, further complicate the fragmentation selection, considering the ephemeral nature of the transmissions in the various channels. It can therefore be quite difficult to select a fragmentation level or a transmission channel to maximize the average throughput rate.

BRIEF SUMMARY OF THE INVENTION

It is therefore an object of this invention to provide a method and a network element for wireless communication of digital data in which the average throughput rate is maximized.

It is a further object of this invention to provide such a method and element in which the optimizing of the average throughput rate can adapt to the environment in the frequency band being used.

It is a further object of this invention to provide such a method and element for detecting a condition in which packet error rates are predominantly due to interference.

It is a further object of this invention to provide such a method in which the optimization can be effected at the transmitter, without requiring change in the characteristics of the receiver.

Other objects and advantages of this invention will be apparent to those of ordinary skill in the art having reference to the following specification together with its drawings.

This invention may be implemented by way of an adaptive optimization of the packet length for wireless transmissions, particularly in environments with interferers. According to the invention, a successful rate value is determined for an iteration of a packet length. For example, the successful rate value may correspond to the product of the probability of communicating a packet without error, with a ratio corresponding to the payload length over the total transmission time for the packet. The next packet length iteration is then determined by applying a weighted difference of the most recent successful rate values to the current packet length iteration.

According to another aspect of the invention, a method of determining the effects of interference on packet error length involves the comparison of an expected packet error rate based on signal-to-noise characteristics of the channel with an actual packet error rate based on error detection at the receiver for the actual payload.

BRIEF DESCRIPTION OF THE SEVERAL VIEWS OF THE DRAWING

FIG. 4b is a qualitative plot of data rate versus packet length for one of the conditions of FIG. 4a.

DETAILED DESCRIPTION OF THE INVENTION

Referring now to the Figures, an exemplary implementation of this invention in connection with a wireless local area network (LAN) will now be described. As will become apparent, this invention is particularly beneficial when applied to wireless networks, considering the increased average data throughput rate that is achievable over a wide variety of time-varying conditions, by way of this invention. Those skilled in the art having reference to this specification will readily comprehend, however, that this invention may also be used in connection with other packet-based communications applications, with particular benefit to those applications that have ephemeral and frequency-hopping interferers. Accordingly, it is contemplated that those skilled in the art will recognize that the following description is presented by way of example only.

Figure 1:
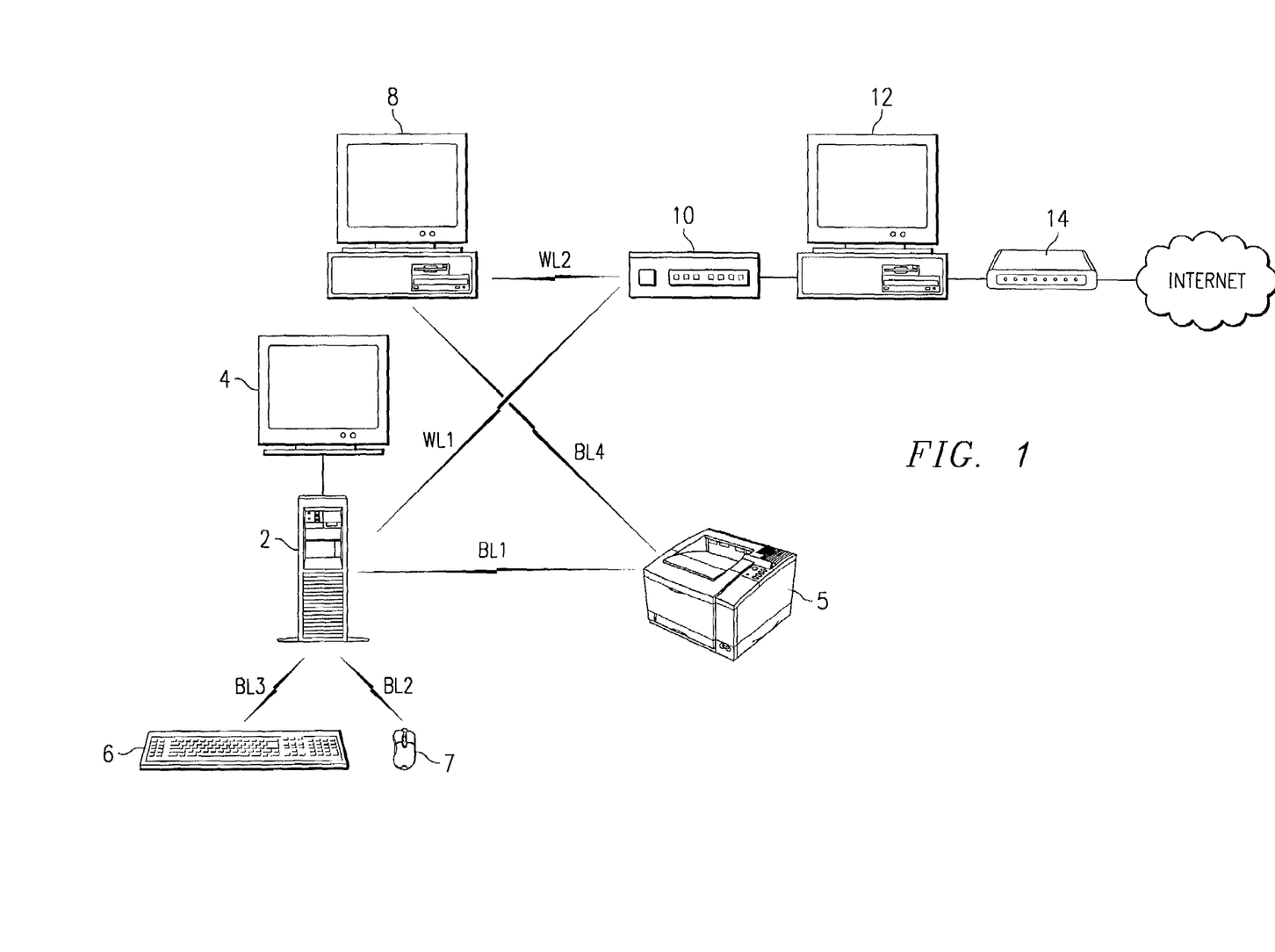
FIG. 1 is an electrical diagram, in block form, of a wireless local area network (LAN) in an environment with interfering transmissions such as from a group of Bluetooth devices.

FIG. 1 illustrates an example of a wireless LAN environment into which the preferred embodiment of the invention is implemented. As is fundamental to those in the art, wireless LAN environments can vary widely from installation to installation, and indeed can vary widely over time within a single installation as different devices are installed, used, or enter and exit the signal range of the wireless LAN. Accordingly, the environment of FIG. 1 is presented by way of example only.

Figure 2:
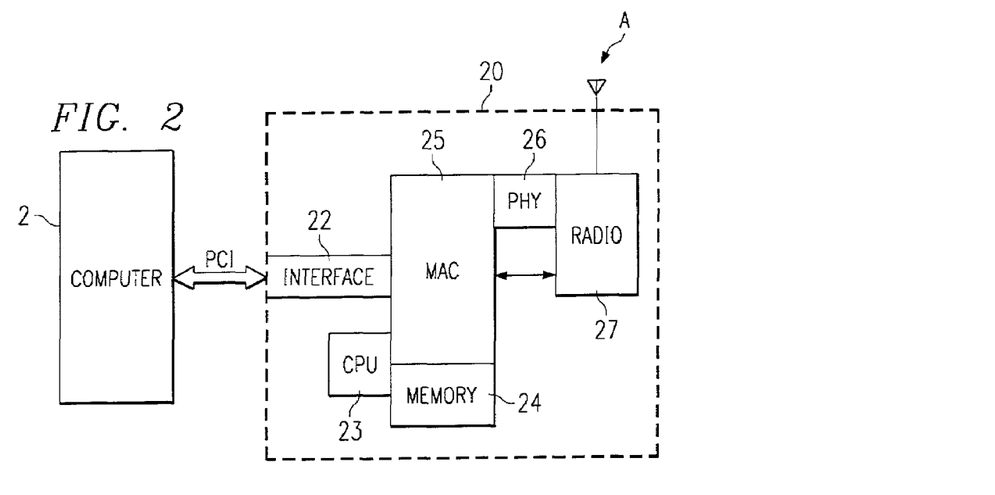
FIG. 2 is an electrical diagram, in block form, of a wireless network adapter within which the preferred embodiment of the invention may be implemented.

In FIG. 1, computer 2 is enabled to carry out wireless LAN communications to and from wireless LAN access point 10 by way of wireless LAN adapter 20, which transmits and receives signals according to the IEEE 802.11 standard over wireless link WL1. FIG. 2 illustrates an example of the construction of wireless LAN adapter 20, in cooperation with computer 2.

In the example of FIG. 2, wireless LAN adapter 20 includes host interface 22, which controls communications with computer 2 over bus PCI. Host interface 22 communicates with medium access controller (MAC) 25, which is a conventional controller known in the art. Embedded CPU 23 and off-chip memory 24 cooperate with MAC 25, to effect control of adapter 20 and to provide additional program memory, respectively. Physical layer (PHY) device 26, also referred to as a baseband processor, performs conventional modulation of data signals from MAC 25 into a spread spectrum form for transmission via radio circuitry 27, and demodulation of spread spectrum signals received from radio circuitry 27 into baseband. Antenna A is coupled to radio circuitry 27, in the conventional manner. In this example, interface 22, MAC 25, PHY 26, CPU 23, and some or all of memory 24 may be implemented into a single integrated circuit, such as the ACX100 spread spectrum processor with medium access control, available from Texas Instruments Incorporated. Of course, other architectures may alternatively be used for wireless LAN adapter 20. The arrangement of FIG. 2 is presented merely by way of example.

Computer 2 is also connected to its various input and output devices by way of different facilities. For example, computer 2 is hardwire connected to its monitor 4 by a conventional VGA cable. Computer 2 is also in wireless communication with printer 5, keyboard 6, and mouse 7, by wireless links BL1, BL2, BL3, respectively; in this example, links BL1 through BL3 effect communications according to the Bluetooth standard, which is a well-known short range frequency-hopping communications standard.

The wireless LAN of the example of FIG. 1 also includes other workstations and network services. In this example, workstation 8 is also connected to access point 10 by 802.11 wireless link WL2 via a wireless LAN adapter (not shown), while server 12 is hardwire connected to access point 10 by an Ethernet or other facility. Workstation 8 also shares printer 5, by way of Bluetooth wireless link BL4. In this example, server 12 is connected to modem 14, by way of which Internet access is provided to server 12, and also to computer 2 and workstation 8 over wireless links WL1, WL2, respectively.

As evident from the example of FIG. 1, the multiple wireless communications provide significant opportunities for interference. The 802.11 wireless links WL1, WL2 must, of course, be coordinated so as to not interfere with one another; typically, access point 10 controls the channels (in frequency, or alternatively in time-multiplexed fashion) assigned to these links to avoid interference. However, non 802.11 wireless activity, such as Bluetooth wireless links BL1 through BL 3, cannot be controlled in frequency or time by access point 10. Rather, according to this preferred embodiment of the invention, the presence of these interferers is detected and, in that event, the packet lengths of the wireless LAN links WL1, WL2 are optimized for maximum data rate.

As discussed above in the Background of the Invention, the likelihood that a packet will be interfered with increases with increasing packet length; conversely, if one assumes no interference, the transmission data rate will decrease with decreasing packet length because of packet overhead. According to this invention, a peak data rate as a function of packet length can be derived for a given interference probability, as will now be described.

Figure 3:
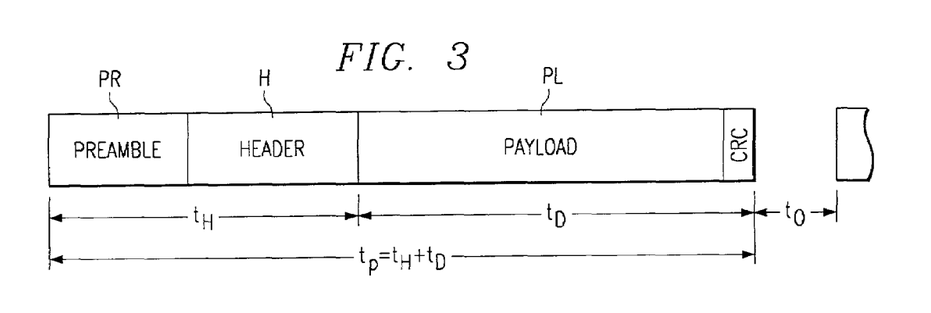
FIG. 3 is a flow chart illustrating a method of determining the presence of packet error due to interference, according to the preferred embodiment of the invention.

FIG. 3 illustrates the construction of a message packet, such as may be transmitted and received according to the IEEE 802.11 standard. The packet includes preamble PR, which includes control and other information regarding the channel, specifically including a current measurement of the signal-to-noise ratio (SNR) and signal-to-interfering-noise ratio (SINR) under the 802.11 standard. Each packet also includes header H, which contains information identifying the message with which the packet is associated, the sequence of this packet in that message, the source and destination addresses of the packet, the packet length, and the like. Payload portion PL of course contains the data being transmitted in the packet, and includes CRC checksum by way of which the receiver detects, and possibly corrects, one or more bit errors in payload portion PL.

By way of definition, the duration of preamble PR and header H portions of the packet occupies time $t_H$, and is considered to be fixed among all packets. Payload portion PL, including its CRC checksum, has a duration $t_D$, and will be varied, according to the preferred embodiments of the invention, for optimum effective data rate. As known in the art, the 802.11 standard (as well as other standards), enforce a minimum interpacket spacing $t_O$, which will also be treated as a fixed quantity in this description. By way of definition, packet length $t_p$ will refer to the sum of times $t_H$ and $t_D$. It will be understood by those skilled in the art having reference to this specification that the various times within the packet may be defined differently, and used in optimizing the packet length, while not departing from the spirit of this invention.

Figure 4A:
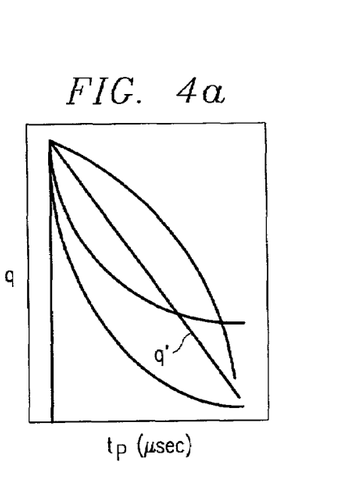
FIG. 4a is a qualitative plot of packet success rate versus packet length, under various conditions.

FIG. 4a illustrates various possible shapes of a success function q, which is the probability that a packet is transmitted without error in a given environment that includes interfering transmissions, as it varies with packet length $t_p$. As shown in FIG. 4a, a minimum packet length $t_p$ exists, corresponding to a packet having one byte of payload portion PL in combination with the preamble PR and header portions H; this minimum of course will be briefly (one byte) longer than time $t_H$. As discussed above, the success rate is maximum for the shortest packets, considering that the probability of interference with a packet is lower as the packet size decreases. The particular relationship of success function q with increasing packet length $t_p$ may take various forms, as suggested by FIG. 4a, including linear and higher order forms. While it is contemplated that a linear approximation q' will usually resemble this relationship, the present invention is equally applicable to other orders of success function q.

Figure 4B:
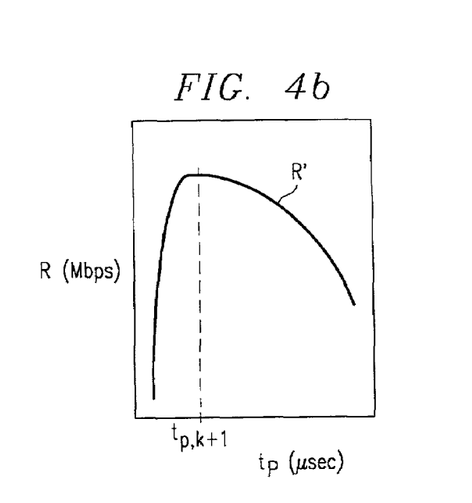

For a given success function $q(t_p)$, one can derive the effective data rate R as a function of packet length $t_p$:

$$R = \frac{t_D \times r}{t_H + t_D + t_O} \times q(t_p) = \frac{(t_p - t_H) \times r}{t_p + t_O} \times q(t_p)$$

where r is the bit rate of data transmission in payload portion PL of the packet. For the case of linear success function q' of FIG. 4a, the data rate function R' as a function of packet length $t_p$ is plotted in FIG. 4b. As evident from FIG. 4b, data rate function R' has a single maximum. According to the preferred embodiment of the invention, an adaptive approach is performed to determine this maximum in operation, and to set the packet length $t_p$ for each transmission to achieve this maximum.

It is possible that no interferers are in the vicinity of wireless LAN adapter 20 and its fellow LAN elements. Knowledge of whether or not an inteferer is in the vicinity may be useful for various purposing such as to notify a user, to provide input to interference avoidance algorithms, to assist networks administrators and to determine whether or not adaptive fragmentation is useful due to the presence of interference. According to the preferred embodiment of the invention, therefore, a method for determining whether interference is present would be useful. This detection method will now be described with reference to FIG. 5.

Figure 5:
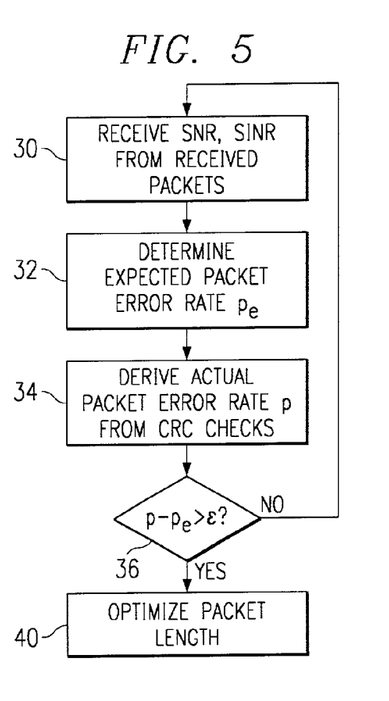
FIG. 5 is a timing diagram illustrating the definition of various times within the transmission of a packet, according to the preferred embodiment of the invention.

The method of FIG. 5 and the other operations of LAN adapter 20 described in this specification are preferably executed by programmable logic within LAN adapter 20, for example by embedded CPU 23. Of course, if MAC 25 or baseband processor 26 has sufficient processing capacity, those other devices may instead be used to perform these operations. Further in the alternative, while the described examples of the methods of this invention are realized by way of computer program routines executable by programmable logic, it is also contemplated that these operations could be realized by custom hardwired logic, if desired.

Referring to FIG. 5, measured values of signal-to-noise ratio (SNR) and signal-intersymbol interference-noise ratio (SINR) are received by LAN adapter 20 in process 30. As noted above, these parameters are estimated during reception of packet preamble PR, from another network element in the wireless LAN. Each communications channel, being bidirectional, is evaluated by the network elements on that channel, and the network elements may communicate their measurements of channel behavior to one another. In the case of the SNR and SINR measurements, the various network elements in the network are able to determine these basic performance parameters by analysis of the known contents of packet preamble PR, as is known in the art. As known in the art, the SNR relates to the signal strength and noise within a given channel, while the SINR relates to the intersymbol interference experienced, for example because of multipath interference. These values thus are not intended to account for the presence of other interfering transmissions within the network range.

Once the SNR and SINR values for the current channel are known, LAN adapter 20 calculates an expected packet error rate $p_e$ in process 32. Methods for the statistical determination of the probability that a given packet will fail, for a given set of SNR and SINR values, are known in the art. As noted above, however, this expected packet error rate $p_e$ will not fully appreciate the effects of interfering transmissions, such as may be present due to Bluetooth or other sources.

In process 34, LAN adapter 20 estimates the true packet error rate p, including the effects of interfering transmissions. This derivation is preferably performed for a channel by analyzing the number of packets that it transmits and that are not safely received, relative to the total number of packets transmitted over that channel. The criteria used to determine successful transmission is preferably based on the CRC checksum that is transmitted with the payload of each packet, and that the receiving network element, such as access point 10 for LAN adapter 20, checks against the payload portion PL of the packet itself. The overall results of the fraction of those packets that were received safely can be derived from acknowledgement messages from access point 10. Alternatively, the network elements in the wireless LAN may communicate the success ratio for each channel by way of control packets. In any event, whether LAN adapter 20 calculates the packet error itself from acknowledge messages, or receives a packet error rate value from access point 10 or elsewhere in the network, the actual packet error rate p is determined in process 36.

In decision 36, LAN adapter 20 determines whether the actual packet error rate p exceeds the expected packet error rate $p_e$ by more than a threshold amount $\epsilon$. If no interfering transmissions are present, the actual packet error rate p will vary about the expected error rate $p_e$, either due to the approximation of the expected error rate $p_e$ or because of statistical variations. As such, threshold $\epsilon$ is preferably set high enough so that, when exceeded, one can be confident that interfering transmissions are actually present in the network environment. If threshold $\epsilon$ is not exceeded (decision 36 is NO), control returns to process 30 to continue the monitoring of the packet error rates. If interfering transmissions appear to be present, based on the comparison of the expected error rate $p_e$ and the actual packet error rate p, LAN adapter 20 then detects the presence of an interferer, such as Bluetooth, that was not anticipated by the SNR and SINR, in process 40.

It is contemplated that the process of FIG. 5 may be used to determine whether interfering transmissions are present in the network, in conjunction with a wide variety of optimization processes, including process 40 according to the preferred embodiment of the invention as will be described in detail below. Alternatively, once interference has been detected using the method of FIG. 5 according to the preferred embodiment of the invention, other conventional methods for avoiding the effects of interference may also be used, such methods including dynamic channel selection, conventional fragmentation, and the like.

Figure 6:
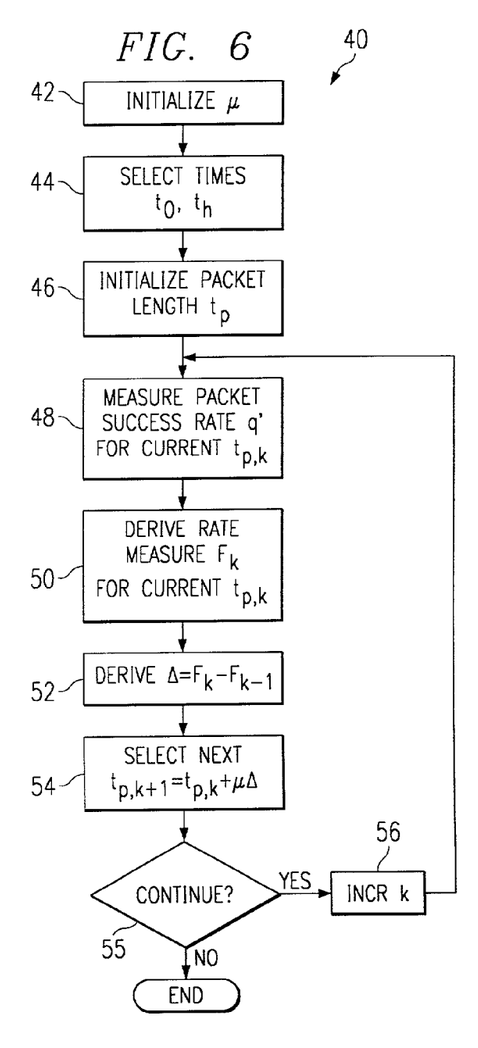
FIG. 6 is a flow chart illustrating a method of optimizing packet length in an interfering environment, according to the preferred embodiment of the invention.

Referring now to FIG. 6, packet length optimization process 40 according to the preferred embodiment of the invention will now be described in detail. While process 40 is preferably used in combination with the interference detection process of FIG. 5 discussed above, it is also contemplated that process 40 may be used with other means of detecting interference, or alternatively may be unconditionally used upon the establishment of each and every communications channel.

In process 42, learning constant $\mu$ is initialized. As will become apparent below, learning constant $\mu$ is a constant that determines the rate of change of packet length $t_p$ for a given calculated data rate change. The value of learning constant $\mu$ is preferably determined empirically for the expected wireless LAN environment, considering that a value of learning constant $\mu$ that is too high will result in oscillation, while a value that is too low will delay optimization. According to this example, a useful value of learning constant $\mu$ is about 1.275. In process 44, other parameters in optimization process 40 are initialized, including the appropriate values of header and preamble time $t_H$ and interpacket spacing $t_O$. In process 46, an initial packet length $t_{p,k}$ and a prior initial packet length $t_{p,k-1}$ are set; in addition, a prior rate measure $F_{k-1}$ may be set (to any arbitrary value, including zero).

In process 48, a current packet success rate $q'(t_{p,k})$ for initial packet length $t_{p,k}$ is determined. Measurement process 48 may be performed by the transmission of actual message packets at the current packet length $t_{p,k}$ and the calculation of an actual packet success rate based on checksum results at the receiver, as described above relative to process 34 (FIG. 5). Alternatively, a success rate function $q'(t_p)$ may be known or assumed, in which case the packet success rate $q'(t_{p,k})$ is determined by applying the current packet length $t_{p,k}$ to this function.

In the adaptive algorithm of optimization process 40, a rate measure $F_k$ is next derived, for the current packet length $t_{p,k}$. This rate measure $F_k$ operates as a fitness function, in the adaptive algorithm sense, by way of which the packet length $t_{p,k+1}$ for the next iteration is determined. According to this preferred embodiment of the invention, an example of rate measure $F_k$ is:

$$-F_k = q'(t_{p,k}) \times \frac{(t_{p,k} - t_H)}{(t_{p,k} + t_O)}$$

As evident from this definition of rate measure $F_k$, the parameters involved in the calculation of process 50 includes the success rate (estimated or actual) for the current packet length $t_{p,k}$, and a ratio of the actual data portion of the packet relative to the entire packet length, including its interpacket spacing. Other factors may also be used in this measure, including maximum data rate and the like, as desired.

In process 52, LAN adapter 20 derives difference value $\Delta$ based on the difference between the current and previous rate measures F, as follows:

$$-\Delta = F_k - F_{k-1}$$

The negative applied to rate measure $-F_k$ and difference value $\Delta$ reflects the use of these values as negative feedback in the adjustment of the packet length $t_p$ in process 54. In process 54, the next packet length $t_{p,k+1}$ is generated based on the difference $\Delta$ in the rate measures F, with the learning factor $\mu$, as follows:

$$t_{p,k+1} = t_{p,k} + \mu \Delta$$

Decision 55 is then performed, to determine if additional adjustment of the packet length by the execution of another iteration of the loop is necessary. The decision criterion used in decision 55 may be a convergence criterion, by way of which the difference between next packet length $t_{p,k+1}$ and prior packet length $t_{p,k}$ is measured against a convergence threshold; alternatively, optimization process 40 may be performed for a preselected number of iterations, in which case decision 55 would simply interrogate a loop counter. In any event, if the appropriate convergence criterion has not yet been met (decision 55 is YES), index k is incremented in process 56 so that the next packet length becomes the current packet length for purposes of this method, and control passes to process 48 for measurement or determination of the packet success rate q'.

On the other hand, upon the convergence criterion being reached (decision 55 is NO), the next packet length $t_{p,k+1}$ is then applied to transmissions from LAN adapter 20 over that channel. In the case of 802.11 communications, the adjustment of packet length $t_p$ is made by adjusting a parameter $D_B$ which specifies the number of data bytes to be transmitted in each packet; the data time $t_D$ will correspond to the data byte parameter $D_B$ times the channel data rate r. This optimized packet length $t_{p,k+1}$ is thus the packet length for which the actual data rate is maximized, for the interference present in the network. With reference to FIG. 4b, the optimized packet length $t_{p,k+1}$ is illustrated as corresponding to that for which the data rate R is at approximately a maximum. This is accomplished, according to this embodiment of the invention, by iterating the process of FIG. 6 until the difference in rate measure F nears zero, corresponding to the derivative of the rate curve R being at or near zero at this maximum. If desired, following convergence, the method of FIGS. 5 and 6 may be repeated periodically, to ensure that the data rate remains optimized as interference conditions in the network area change over time.

This invention thus provides important advantages in the operation and use of a wireless network, in environments in which the network is prone to interference from other wireless devices. The effects of interference in causing packet errors are minimized by fragmentation of the messages, but in an adaptive manner that maximizes the overall successful packet data rate. In addition, this invention provides a way in which the presence of interference can be detected, and the optimization process initiated or repeated, as necessary. In addition, the receiving network element need not perform any additional function in order for the optimization to be executed; rather, the transmitting network element can optimize the packet length using only feedback from the access point or other receiving network element that is already provided under the appropriate standard, such as IEEE 802.11. Of course, this invention may also be used in connection with other wireless standards.

While this invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of optimizing packet length for wireless transmissions, comprising the steps of:
   selecting a trial packet length value;
   determining a packet success rate for the trial packet length value;
   evaluating a rate measure value for the trial packet length value, based upon the packet success rate for the trial packet length value;
   adjusting the trial packet length value responsive to a difference in the rate measure value for the trial packet length value from a prior rate measure value for a prior trial packet length value; and
   repeating the selecting, determining, evaluating, and adjusting steps until a convergence criterion is reached.

2. The method of claim 1, further comprising:
   selecting a learning constant value;
   wherein the adjusting step comprises:
   multiplying the difference in rate measure values by the learning constant value; and
   adjusting the trial packet value by an amount corresponding to the result of the multiplying step.

3. The method of claim 1, wherein the step of determining a packet success rate comprises:
   applying the trial packet length value to a packet success rate function.

4. The method of claim 1, wherein the step of determining a packet success rate comprises:
   measuring an actual packet success rate for a plurality of transmitted packets having the trial packet length value.

5. The method of claim 1, wherein the rate measure value corresponds to a product of the packet success rate and a ratio of the payload portion of each packet to an overall packet length including interpacket spacing.

6. The method of claim 1, further comprising:
   estimating an expected packet error rate based upon a signal-to-noise ratio of a channel;
   evaluating an actual packet error rate from the actual transmissions of packets over the channel; and
   comparing the actual packet error rate to the expected packet error rate;
   wherein the selecting, determining, evaluating, adjusting, and repeating steps are performed responsive to the result of the comparing step.

7. The method of claim 6, wherein the selecting, determining, evaluating, adjusting, and repeating steps are performed responsive to the comparing step determining that the actual packet error rate exceeds the expected packet error rate by at least a selected threshold amount.

8. A wireless local area network adapter, comprising:
   an interface, for coupling the adapter to a host computer;
   radio circuitry, for transmitting and receiving signals over an antenna, the transmitted signals being in the form of packets including a payload portion and a preamble portion, with successive packets being transmitted with a selected interpacket spacing therebetween;
   signal processing circuitry, coupled between the interface and the radio circuitry, for modulating signals to be transmitted by the radio circuitry, and for demodulating signals received by the radio circuitry; and
   programmable logic, for optimizing the length of the payload portion of the packets, programmed to optimize the length of the payload portion of the packets by executing a sequence of operations comprising:
   selecting a trial packet length value;
   determining a packet success rate for the trial packet length value;
   evaluating a rate measure value for the trial packet length value, based upon the packet success rate for the trial packet length value;
   adjusting the trial packet length value responsive to a difference in the rate measure value for the trial packet length value from a prior rate measure value for a prior trial packet length value;
   repeating the selecting, determining, evaluating, and adjusting steps until a convergence criterion is reached; and
   then setting the length of the payload portion of each of the packets according to the trial packet length value upon the convergence criterion being reached.

9. The adapter of claim 8, wherein the sequence of operations performed by the programmable logic further comprises:
   selecting a learning constant value;
   wherein the adjusting operation comprises the steps of:
   multiplying the difference in rate measure values by the learning constant value; and
   adjusting the trial packet value by an amount corresponding to the result of the multiplying step.

10. The adapter of claim 8, wherein the operation of determining a packet success rate comprises the step of:
    applying the trial packet length value to a packet success rate function.

11. The adapter of claim 8, wherein the operation of determining a packet success rate comprises the step of:
    measuring an actual packet success rate for a plurality of transmitted packets having the trial packet length value.

12. The adapter of claim 8, wherein the rate measure value corresponds to a product of the packet success rate and a ratio of the payload portion of each packet to an overall packet length including interpacket spacing.

13. The adapter of claim 8, wherein the sequence of operations performed by the programmable logic further comprises:
   estimating an expected packet error rate based upon a signal-to-noise ratio of a channel;
   evaluating an actual packet error rate from the actual transmissions of packets over the channel; and
   comparing the actual packet error rate to the expected packet error rate;
   wherein the sequence of the selecting, determining, evaluating, adjusting, and repeating operations is executed responsive to the result of the comparing step.

14. The adapter of claim 13, wherein the sequence of the selecting, determining, evaluating, adjusting, and repeating operations is executed responsive to the comparing operation determining that the actual packet error rate exceeds the expected packet error rate by at least a selected threshold amount.

15. The adapter of claim 8, wherein the signal processing circuitry comprises:
   a baseband processor, for modulating and demodulating signals to be transmitted and received, respectively; and
   medium access control circuitry, coupled to the interface, for processing signals to be modulated and received demodulating signals.

16. The adapter of claim 15, wherein the programmable logic comprises an embedded central processing unit;
   and wherein the embedded central processing unit, the baseband processor, and the medium access control circuitry are integrated into a single integrated circuit.

* * * * *